3,016,124
ARTICLE HANDLING APPARATUS
Alton L. Crosby, Austin, and Henry W. Roeber, Emporium, Pa., assignors to Sylvania Electric Products Inc., a corporation of Delaware
Filed Apr. 4, 1960, Ser. No. 19,838
2 Claims. (Cl. 198—33)

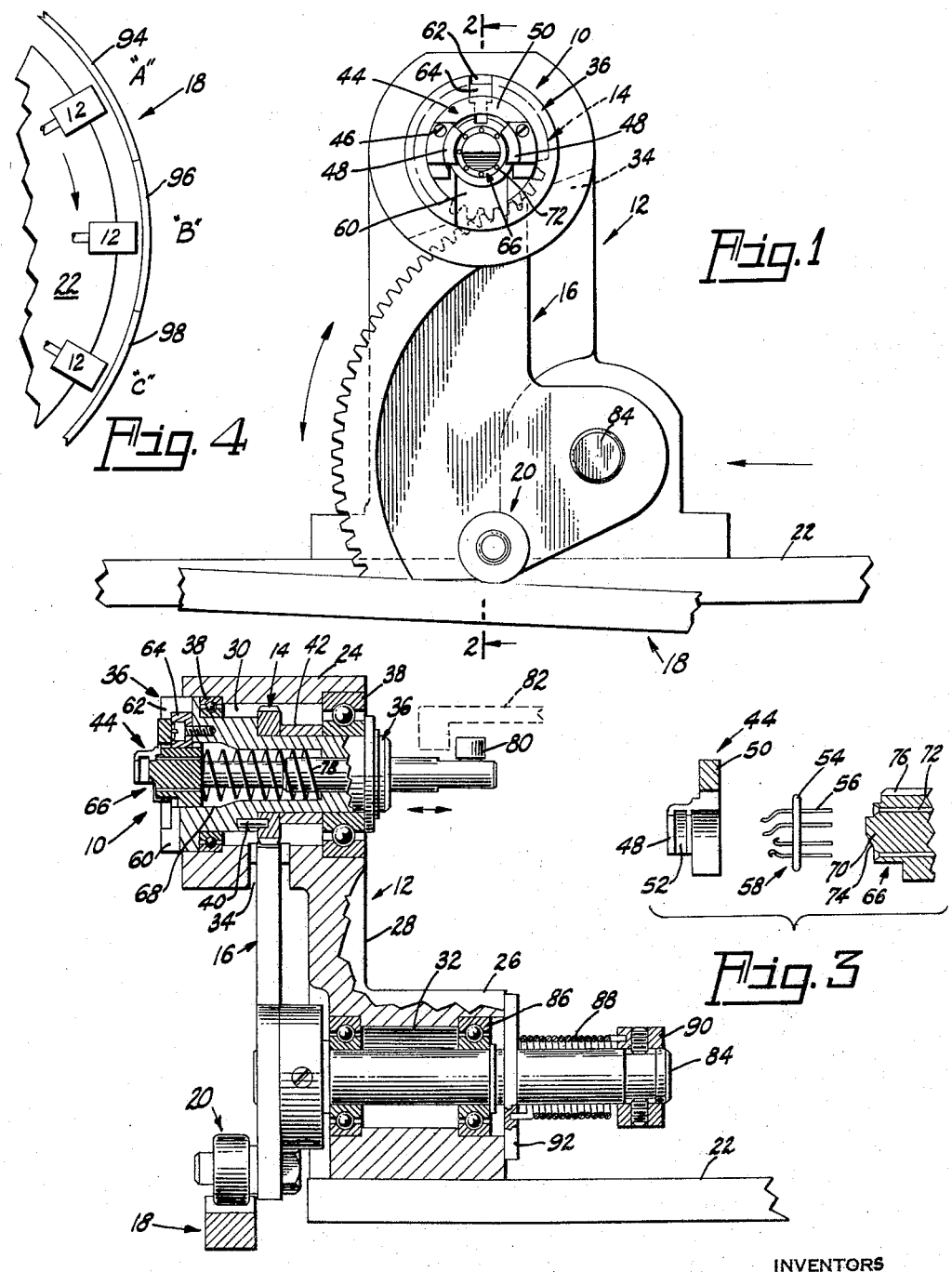

This invention relates generally to article handling apparatus and more particularly to apparatus for transporting and positioning an article.

During the manufacture of electron discharge devices, as for example receiving tubes and the like, it is necessary to connect the operative electrodes, i.e., cathode, grids, and anode, to their supports. The supports, in most cases, are the leads which connect the electrode to the associated external circuitry in the device employing the tube. These leads or lead-in pins are fabricated from conductive material and are usually molded into an insulating wafer in a patterned array depending upon the tube type. This structure is generally called a stem and is subsequently joined to the rest of the envelope. The pins, on one side of the wafer, are substantially parallel to one another and to the axis of the usually circular wafer. On the other side of the wafer the pins are formed, by other apparatus, to the shapes, sizes and positions required for attachment to the electrodes.

Manufacturing techniques have advanced, today, to the point where the electrodes are accurately located and preassembled into a self-sustaining mount or cage by automatic equipment. Advantage may be taken of this in the provision of apparatus for securing the amount to the molded and formed stem. Heretofore, the joining of the mount to the stem had been done manually due to the variations in position of the parts to be joined. Furthermore the delicate nature of the electrodes and the smaller diameter leads combined to require that the joining operator be gifted with an extremely high degree of manual dexterity in order to accurately position the parts, thus increasing the costs of manufacture.

Positioning of the stem, with its formed leads on one side, thin fragile wafer, and parallel leads on the other side, was extremely difficult since little or no place was available for grasping the article that might not, during the joining operation, result in distortion of the stem or mount.

Therefore, it is an object of this invention to reduce the rejection rate of assembled discharge devices due to misalignment or distortion of the stem. It is yet another object of the invention to provide apparatus for accurately positioning a stem without distorting the leads. It is a still further object of the invention to provide apparatus for positioning a stem which will not obscure the formed leads, yet will accurately position the stem and protect the wafer and parallel leads from injury.

The foregoing and other objects and advantages are achieved in one embodiment of the invention by a device for selectively angularly positioning an article about its longitudinal axis. Means are provided for holding the article with its longitudinal axis in a given position. Driven means are secured to the holding means and both are carried, for rotation about the longitudinal axis of the article, by support means. Driver means, also carried by the support means, engages the driven means. Further means are provided for moving the driver means whereby the article is rotated about its longitudinal axis a distance proportional to the movement of the driver means.

For a better understanding of the invention, reference is made to the following description taken in conjunction with the accompanying drawings in which:

FIG. 1 is a front view of the apparatus;

FIG. 2 is a side view of the apparatus of FIG. 1 taken along the lines 2—2 of FIG. 1 with some parts in section and other parts broken away or omitted in the interests of simplicity and clarity;

FIG. 3 is a fragmentary view similar to FIG. 2, on an enlarged scale, and

FIG. 4 is a diagrammatic plan view of a machine employing a plurality of the hereinafter described article positioning devices.

The stem positioner is particularly useful in conjunction with the welding head described in the application entitled "Welding Apparatus," Serial Number 19,828, concurrently filed herewith which is assigned to the same assignee as the present invention. The positioner locates the stem lead, to be welded to an electrode, at a position where it may be easily reached by the welding electrodes without interfering with the other leads. Since a plurality of welds are to be formed, it is necessary that the stem be accurately located at a plurality of workstations whereat independent welders are located.

Referring now to the drawings, in the aspect of the invention illustrated, an article holding means 10 is carried by a housing support 12. Driven means 14 is affixed to the holding means 10 for rotation therewith while driver means 16 is mounted on the housing 12. The portion of the extended surface cam or cam track 18 shown in the drawings cooperates with the driver mounted cam follower 20 to move the driver upon relative movement between the housing and the cam surface 18.

The housing 12, which is shown secured to a fragment of an indexible turret 22, comprises opposed bosses 24, 26, interconnected by web 28. Article holding means 10 is carried in passageway 30 formed in upper boss 24. Driver means 16 is pivotally supported in passageway 32 of lower boss 26. The longitudinal axis of passageways 30 and 32 are aligned. Recess 34 penetrates the boss 24 to passageway 30 and provides access to the driven member 14 for the driver member 16.

The stem holding means 10 includes a first stem holder portion or jaw support 36 carried in passageway 30 by bearings 38. Driven member 14, shown as a spur gear, is coaxial with support 36 and is secured to it by pin 40. Gear 14 is retained in position against the support 36 by spacer 42. Wafer contacting member or jaw 44 is attached to the first portion 36 by screws 46. Jaw 44 extends transversely to the axis of the support 36. Jaw 44 is provided with grooved arms 48 connected by bight 50. The groove 52, formed in the arms 48, is wide enough to snugly contain a peripheral portion of the wafer 54 which, together with leads 56, forms stem 58. Recess 60 is formed in the face of the jaw supports 36 to provide clearance for the parallel portion of the leads 56 when a stem 58 is moved into the holding means 10. A second and smaller recess 62 is provided in the support 36 for key 64 which restrains the second or inner holder portion 66 from rotation relative to the first or outer portion 36.

The inner holder portion or jaw 66, generally cylindrical in shape, is slidably carried within recess 68 in the first jaw portion 36. Stem receiving end 70 of jaw 66 is formed to provide a plurality of axially aligned apertures 72 arranged in a patterned array about its longitudinal axis. This pattern corresponds to the arrangement of the pins 56 of stem 58. Therefore, when a stem is positioned with its leads 56 contained within the apertures 72 it is coaxial with the jaw 66 which, in turn, is coaxial with the outer portion 36 and driven means 14. Inclined surface 74 (FIG. 3) guides the stem 58 into seating position. Groove 76 cooperates with key 64 to prevent rotation of the inner jaw 66 relative to the outer jaw 44 but allows reciprocating movement of the inner jaw 66 along the longitudinal axis of the holder. The apertured end 70 is normally kept in contact with jaw 44 by spring 78 which reacts between end 70 and outer portion 36 within recess 68.

Roller 80 is secured to the free end of member 66 where it may be contacted by the operating means 82 shown in phantom in FIG. 2. The operating means may be an arm movable relative to the housing to reciprocate the inner member 66 from clamped to an unclamped position or it may take the form of a fixed cam whereby the relative movement between the housing and the cam causes the jaw 66 to be withdrawn.

Driver means 16 is secured to a shaft 84 which is carried by bearings 86 in passageway 32 formed in lower boss 26. A cam follower 20 is rotatably affixed to member 16 and is urged against the surface of cam track 18 by torsion spring 88. Spring 88 reacts between a collar 90 affixed to the shaft and a plate 92 secured to boss 26. The changing inclination of the track 18 causes the driver 16 to pivot thus repositioning the stem 58 by rotating the driven gear 14. While a cam track is illustrated, wherein relative movement between the housing and the track causes the driver 16 to pivot, it is possible that the housing may be restrained while a cam is moved relative thereto to produce a pivoting movement of the driver 16 without departing from the spirit of the invention.

The driven member 14 and driver member 16 shown in the drawings comprise a pair of mating spur gears. While other means for positively engaging the rotating article holder and the driving member may be utilized it has been found to be particularly advantageous to employ gears, as shown in the drawing, since a lever arm advantage may be obtained while the holder position is still made accurately and positively responsive to the position of the driver 16.

Adverting to FIG. 4, the apparatus heretofore described may be advantageously employed in apparatus having a plurality of workstations A, B, C, etc. with inclined cam tracks 94, 96, 98, at each station. When the turret 22 is indexed the housing will move from station to station. The angular position of the article retained in the holder will be dependent upon the elevational position of the cam track sections 94, 96, 98, relative to the housing.

Reference will now be made to the mode of operation of the apparatus shown in the drawings, for a better understanding of the invention.

The apparatus shown in the drawings is in the loading and unloading position wherein the inner jaw 66 may be withdrawn by the jaw operating means 82. A stem 58 may be passed into the contacting jaw 44 with the stem leads 56 passing through the recess 60. When employed with the automatic stem forming apparatus previously mentioned, the stem is delivered to the housing with the leads 56 oriented so that they are in registration with the jaw apertures 72 and may be passed directly into the apertures when the inner member 66 is released by the operating means 82. When a stem is inserted manually the operator may visually align the leads with the apertures.

Wafer 54 is seated in the groove 52 of arms 48 and the operating means 82 functions to release the inner jaw 66 whereby the end 70 of the jaw clamps the wafer within the contacting member 44, against the wall of the groove due to the action of spring 78. Subsequently, relative movement between the surface of cam 18 and housing 12 causes the driver 16 to pivot about shaft 84 against the force of spring 88. The pivotal movement of the driver causes the driven member 14 to be rotated about its center. Since the center of the driven member 14 is coaxial with the axis of holding means 10, the pivoting movement of the driver 16 results in the rotation of the article holder 10 about its axis. Due to the previously described alignment of the article axis with the holder axis the article is rotated about its longitudinal axis.

In the embodiment of the invention shown in the drawings the driver 16 is a segment of a gear having a radius many times that of the driven gear 14. Because of this ratio a multiplying effect is obtained wherein the degree of movement of the driver 16 is reflected in a much greater movement of the driven member 14. While other forms of engaging the driver and driven means may be employed it has been found to be particularly advantageous to use gearing since a tooth structure may be selected which produces minimum amount of slip or backlash between the members 14, 16.

Referring to FIG. 4, when the device is utilized with a sequentially arranged segmented cam track 18 (94, 96, 98), it is possible to selectively angularly position the article in a holder by adjusting the relative elevational inclination and position of the cam track segment with respect to the housing 12. Coupled with use of an indexing turret 22, it is then possible to present the article in different sequential positions at each of the workstations A, B, C. Return spring 88 maintains the cam follower 20 tightly against the cam track 18 so that the inclined position of the cam track is accurately reflected in the angularly position of the article. After going through a cycle, during which time a mount may be secured to the formed leads, the apparatus is returned to the starting position wherein the jaw retracting roller 80 is again in registration with the operating means 82 and the stem and assembled mount may be removed in a manner similar to that in which a stem alone was originally inserted.

The apparatus hereinbefore described is particularly useful in positioning small articles such as the stem portion of an electron discharge device about its longitudinal axis. It has the advantage of removing the requirement for a high degree of operator dexterity while being capable of accurately holding and positioning the stem.

Although one embodiment of the invention has been shown and described, it will be apparent to those skilled in the art that various changes and modifications may be made therein without departing from the scope of the invention as defined by the appended claims.

What is claimed is:

1. In a device for selectively angularly positioning a stem composed of an insulating wafer having a plurality of depending leads arranged in a patterned array about the longitudinal axis of said stem, the combination comprising a housing; a first stem holder portion mounted in said housing for rotation about the longitudinal axis of said first portion, a gear affixed to said first portion for rotation therewith, said first portion including a wafer contacting member transverse to said portion axis; a second stem holder portion mounted in said first portion for reciprocating movement along the axis of said first portion, said second portion slidably secured to said first portion for concurrent rotation therewith, said second portion including a member having apertures formed therein for receiving the depending leads of said stem, said apertures aligned with said first portion axis; a spring reacting between said first and second holder portions along said first portion axis whereby a stem may be held between said wafer contacting member and said apertured member with the longitudinal axis of said stem aligned with said first portion axis; a multilated gear pivotally mounted on said housing in engagement with said gear affixed to said first portion, a cam follower mounted on said mutilated gear, a cam in contacting relation with said follower, and means for producing relative movement between said cam and said housing whereby said mutilated gear is caused to pivot on said housing thereby rotating said holder portions a distance proportional to the movement between said cam and said housing.

2. In a device for selectively angularly positioning a stem composed of an insulating wafer having a plurality of depending leads arranged in a patterned array about the longitudinal axis of said stem, the combination comprising a housing; a first stem holder portion mounted in said housing for rotation about the longitudinal axis of said first portion, driven means affixed to said first portion for rotation therewith, said first portion including a wafer contacting member transverse to said portion axis; a second stem holder portion mounted in said first portion for reciprocating movement along the axis of said first portion, said second portion slidably secured to said first portion for concurrent rotation therewith, said second portion including a member having apertures formed therein for receiving the depending leads of said stem, said apertures aligned with said first portion axis; driver means mounted for pivotal movement on said housing in cooperative relationship with said driven means; and means for pivoting said driver means whereby said article is rotated about its longitudinal axis a distance proportional to the pivotal angular movement of said driver means.

References Cited in the file of this patent
UNITED STATES PATENTS

| | | |
|---|---|---|
| 389,195 | Charpentier | Sept. 11, 1888 |
| 612,833 | Dexter | Oct. 25, 1898 |
| 2,240,093 | Farris | Apr. 29, 1941 |